C. J. CRAIG.
ANGLE INDICATOR.
APPLICATION FILED JUNE 29, 1918.
1,287,242.
Patented Dec. 10, 1918.
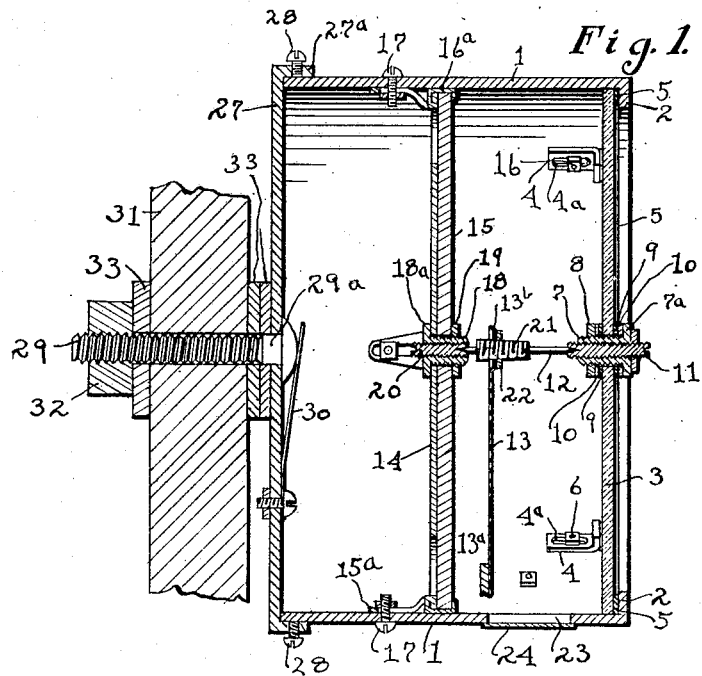
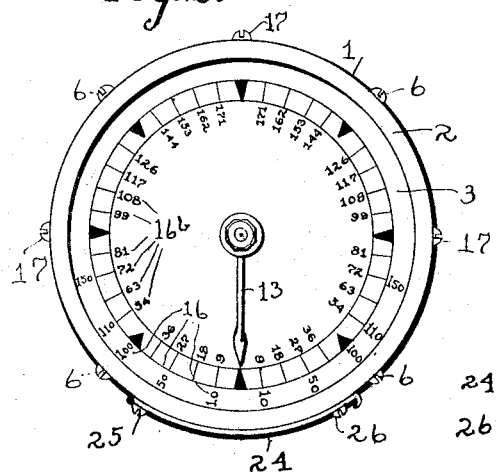
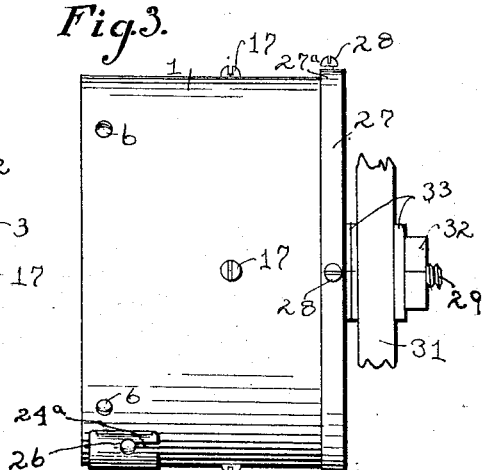
Inventor
C. J. CRAIG.
By N. S. Hill
Attorney

UNITED STATES PATENT OFFICE.

CASPER J. CRAIG, OF HASKELL, OKLAHOMA.

ANGLE-INDICATOR.

1,287,242.

Specification of Letters Patent.   Patented Dec. 10, 1918.

Application filed June 29, 1918.   Serial No. 242,583.

*whom it may concern:* t known that I, CASPER J. CRAIG, a citithe United States, residing at Haskell, county of Muskogee, State of Oklahave invented a new and useful Angletor; and I do hereby declare the folto be a full, clear, and exact descripf the invention, such as will enable skilled in the art to which it appero make and use the same.

present invention relates to an angle or, and has for its object to provide ce of this character which embodies features of construction whereby it idicate with accuracy the angular inon or relation between the object to it is attached and the horizontal.

her objects of the invention are to e an angle indicator which is comvely simple and inexpensive in its conon, which can be easily assembled and apart, which can be readily adjusted in a delicate bearing for the pointer, hich admits of the pointer being refrom position and replaced without ecessity of taking the instrument these and other objects in view, the on consists in certain novel combinand arrangements of the parts as will fully appear as the description pro-the novel features thereof being l out in the appended claims.

a full understanding of the invention, ice is to be had to the following deon and accompanying drawing, in re 1 is a vertical sectional view h an angle indicator constructed in ance with the invention.

2 is a front view thereof.

3 is a side elevation of the device.

esponding and like parts are referred the following description and indin all the views of the drawings by the eference characters.

rring to the drawings, which illusne embodiment of the invention, the al 1 designates a cylindrical casing is open at both ends, the forward end being provided with an inturned 2. A glass plate 3 is arranged in the if the casing and clamped in position n the flange 2 and angle brackets 4.

Felt or suitable packing material 5 is interposed between the glass and the flange, as well as between the glass and the angle brackets. One arm of each of the angle brackets 4 is longitudinally slotted at $4^a$ to receive a clamping bolt 6, said bolts holding the angle brackets securely in an adjusted position. A bushing 7 which is threaded interiorly and exteriorly extends through a central opening in the glass 3, being provided at one end with a head $7^a$ which coöperates with a nut 8 to grip the glass and hold the bushing firmly in position. Felt and copper packing rings 9 and 10 respectively are arranged upon opposite sides of the glass and interposed between the glass and the clamping members, the felt packing rings being in direct engagement with the glass, while the copper packing rings are arranged back of the felt rings. Threaded in the interior of the bushing 7 is a bearing screw 11, the inner end of the screw being formed with a depression which engages one of the pointed ends of the spindle 12 upon which the pointer 13 is mounted.

Adjustably mounted within the casing 1 at an intermediate point in the length thereof is an interior partition 14 which carries a dial plate 15, the front of the dial plate being visible through the glass front 3 and being provided at the periphery thereof with graduations 16 which coöperate with the pointer 13 to indicate the angular deviation from a horizontal position of the object to which the instrument is attached, and also with graduations $16^a$ indicating degrees. At suitable intervals the edge portion of the partition 14 has tongues $15^a$ stamped therefrom, the free ends of the tongues initially projecting toward the center of the partition, and the tongues being bent rearwardly so as to project at right angles to the plane of the partition and fit against the inner walls of the casing 1. An ear $16^a$ is stamped from each of the tongues 15, thereby leaving a longitudinal slot in the tongue, said ears being returned around the edge of the partition so as to grip the periphery of the dial plate 15 and hold the same firmly in position. The slotted portions of the tongues 15 are adjustably engaged by clamping bolts 17 which extend through the casing and engage the tongues to hold the interior partition rigidly in an adjusted position. It will be obvious, however, that by first loosening the bolts 17 the partition 14 can be adjusted toward or away from the front of the casing.

An exteriorly and interiorly threaded bushing 18 extends centrally through the partition 14 and dial plate 15, being provided at one end with a head 18ª which coöperates with a nut 19 to grip the interposed members and hold the bushing firmly in position. A bearing screw 20 is adjustable in the bushing 18, the inner end of the screw being formed with a recess which engages the rear end of the spindle 12 which carries the pointer 13. The bearing screws can be adjusted to obtain a very delicate mounting for the spindles 12, and the pointer may be weighted at 13ª, so that it will always tend to hang in a vertical position. The spindle 12 is formed at an intermediate point in its length with a tapered hub 21 which is fitted in an opening 13ᵇ in the base of the pointer, said base being wedged in position upon the hub by means of a nut 22 which is threaded upon the tapered exterior of the hub. By tightening this nut the base of the pointer is wedged tightly in position and the pointer firmly attached to the hub. It is frequently desirable to remove the pointer for the purpose of grinding the pointed ends of the spindle so that a very delicate bearing can be maintained at all times, and provision is accordingly made for removing the pointer without the necessity of taking the instrument apart. An opening 23 is provided in the bottom of the casing 1 at a point between the intermediate partition 14 and the glass front 3, said opening being of a sufficient size to admit of the pointer being removed from or inserted into position through the same, and being normally closed by a door 24. This door is pivotally connected to the casing at one end thereof by means of a screw 25, and slotted at the other end thereof, as indicated at 24ª, for engagement with a screw or headed stud 26.

The rear end of the cylindrical casing 1 is closed by a flanged back 27, the flange 27ª thereof being provided with set screws 28 which engage the casing to hold the back rigidly in position. A bolt 29 passes centrally through the back 27, being formed at a point adjacent the head thereof with a square portion 29ª which interlocks with the opening in the back to hold the bolt against rotation. A spring strip 30 is applied to the back and pressed against the head of the bolt 29 to hold the bolt in position while passing it through an opening in a suitable support 31 and applying the nut 32 thereto. Suitable washers 33 may be applied to the bolt on opposite sides of the support 31, and after the instrument has been rigidly secured to the support by means of the bolt, any angular movement of the support in a vertical plane will be indicated upon the dial plate 15 by the pointer 13.

Having thus described the invention, what I claim as new and desire to secure by Letters Patent, is:—

1. A device of the character described, including a tubular outer casing, a transparent plate closing the front of the casing, an intermediate partition within the casing, a dial plate carried by the intermediate partition, corresponding bushings extending centrally through the transparent plate and intermediate partition, bearings adjustable within the bushings, a spindle mounted between the bearings, a pointer carried by the spindle and arranged to play over the dial plate, and a back closing the rear end of the tubular casing.

2. A device of the character described including a tubular casing, a transparent plate closing the front of the casing, an intermediate partition arranged between the ends of the casing, a dial plate carried by the intermediate partition, corresponding bearings at the centers of the transparent plate and intermediate partition, a spindle mounted between the bearings, a pointer carried by the spindle and arranged to play over the dial plate, said casing being provided with a side opening which is disposed between the transparent plate and the intermediate partition and through which the needle and spindle are insertible into position, a door normally closing the side opening, and a back closing the rear end of the casing.

3. A device of the character described including a tubular casing, a transparent plate closing the front of the casing, an intermediate partition arranged between the ends of the casing, means for adjusting the position of the intermediate partition, a dial plate carried by the intermediate partition, bushings extending through the transparent plate and intermediate partition, bearing screws threaded within the bushings, a spindle mounted between the bearing screws, a pointer carried by the spindle and arranged to play over the dial plate, and a back closing the rear end of the casing.

4. A device of the character described, including a tubular casing, an intermediate partition arranged between the ends of the casing and having inwardly extending tongues stamped from peripheral portions and bent laterally, fastening members extending through the casing and engaging the tongues to hold the partition in position, a dial plate applied to the partition, and a pointer mounted within the casing and arranged to play over the dial plate.

5. A device of the character described, including a tubular casing, an intermediate partition arranged between the ends of the casing, a dial plate applied to the front of partition, said partition having tongues
ıped from peripheral portions thereof
bent rearwardly and ears being stamped
ı the tongues and bent around the edges
he partition into engagement with the
 plate, fastening members engaging the
ues to hold the partition in position, and
inter mounted within the casing to play
 the dial plate.

A device of the character described, in-
ing a tubular casing, a transparent plate
ng the front of the casing, an inter-
iate partition arranged between the ends
ıe casing and having tongues stamped
ı peripheral portions thereof and bent
ally, ears being in turn stamped from
tongues and bent around the edges of
partition, a dial plate applied to the
partition and secured in position by the
said ears, fastening members extending
through the casing and engaging the tongues
to hold the intermediate partition in posi-
tion, bushings extending through the parti-
tion and transparent front plate, corre-
sponding bearing screws threaded in the
bushings, a spindle mounted between the
bearing screws, and a pointer carried by
the spindle and arranged to play over the
dial plate.

In testimony whereof I have signed my
name to this specification in the presence of
two subscribing witnesses.

CASPER J. CRAIG.

Witnesses:
A. ARNOLD,
R. J. MILAM.

es of this patent may be obtained for five cents each, by addressing the "Commissioner of Patents, Washington, D. C."